(12) United States Patent
Appleyard et al.

(10) Patent No.: US 7,026,421 B2
(45) Date of Patent: Apr. 11, 2006

(54) RANDOM PROPYLENE COPOLYMERS (75) Inventors: David Appleyard, Middlesbrough (GB); Franz Langhauser, Ruppertsberg (DE); Murray Horton, Clevland (GB); Roland Hingmann, Ladenburg (DE); Günther Schweier, Friedélsheim (DE); Volker Rauschenberger, Eisenberg (DE); Ingolf Hennig, Neulussheim (DE); Dieter Lilge, Limburgerhof (DE); Werner Schöne, Schriesheim (DE); Meinolf Kersting, Neustadt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/971,079

(22) Filed: Oct. 25, 2004
(Under 37 CFR 1.47)

(65) Prior Publication Data
US 2005/0085609 A1  Apr. 21, 2005

Related U.S. Application Data (62) Division of application No. 10/043,115, filed on Jan. 14, 2002, now abandoned, which is a division of application No. 09/275,771, filed on Mar. 25, 1999, now abandoned.

(30) Foreign Application Priority Data
Mar. 26, 1998 (DE) .................. 198 13 399

(51) Int. Cl.
*C08F 210/06* (2006.01)
*C08F 210/08* (2006.01)
(52) U.S. Cl. ................. 526/348.6; 526/348.1; 526/348.2; 526/125.3
(58) Field of Classification Search ........... 526/348.1, 526/348.6, 348.2, 125.3
See application file for complete search history.

(56) References Cited

U.S. PATENT DOCUMENTS

| 4,355,144 A | 10/1982 | Shiga et al. |
| 4,668,753 A | 5/1987 | Kashiwa et al. |
| 6,022,628 A * | 2/2000 | Chatterjee et al. .......... 428/523 |

FOREIGN PATENT DOCUMENTS

| DE | 19533337 | 3/1997 |
| DE | 1974765 | 6/1998 |
| EP | 115 940 | 8/1984 |
| EP | 306 867 | 3/1989 |
| EP | 339 804 | 11/1989 |
| EP | 450 456 | 10/1991 |
| EP | 573 862 | 12/1993 |
| EP | 712 869 | 5/1996 |
| EP | 723 978 | 7/1996 |
| EP | 778 295 | 6/1997 |
| EP | 808 870 | 11/1997 |

* cited by examiner

*Primary Examiner*—Caixia Lu
(74) *Attorney, Agent, or Firm*—Novak Druce & Quigg, LLP (57) ABSTRACT Random copolymers of propylene with other 1-alkenes having up to carbon atoms,
  whose content of comonomers is in the range from 0.7 to 1.4% by weight if the only comonomer present in the propylene copolymers is ethylene, or
  whose content of comonomers is in the range from 0.7 to 3.0% by weight if at least one $C_4$–$C_{10}$-1-alkene is present as comonomer, and
  whose cold-xylene-soluble fraction is from 1.0 to 2.5% by weight if ethylene is present as a comonomer in the propylene copolymers, or
  whose cold-xylene-soluble fraction is from 0.75 to 2.0% by weight if the only comonomers present are $C_4$–$C_{10}$-1-alkenes,
and a process for preparing the random copolymers of propylene is described, as is their use for producing films, fibers or moldings, and also the films, fibers and moldings themselves and biaxially stretched films made from random propylene copolymers of this type and processes for their production.

6 Claims, 2 Drawing Sheets

RANDOM PROPYLENE COPOLYMERS

This is a divisional application of Ser. No. 10/043,115, filed Jan. 14, 2002 now abandoned, which is a divisional application of Ser. No. 09/275,771, filed Mar. 25, 1999, now abandoned.

BACKGROUND OF THE INVENTION

The present invention relates to random copolymers of propylene with other 1-alkenes having up to 10 carbon atoms, whose content of comonomers is in the range from 0.7 to 1.4% by weight if the only comonomer present in the propylene copolymers is ethylene, or whose content of comonomers is in the range from 0.7 to 3.0% by weight if at least one $C_4$–$C_{10}$-1-alkene is present as comonomer, and whose cold-xylene-soluble fraction is from 1.0 to 2.5% by weight if ethylene is present as a comonomer in the propylene copolymers, or whose cold-xylene-soluble fraction is from 0.75 to 2.0% by weight if the only comonomers present are $C_4$–$C_{10}$-1-alkenes.

The present invention also relates to a process for preparing the random copolymers of propylene, to their use for producing films, fibers or moldings, to the films, fibers and moldings themselves, and also to biaxially stretched films made from such random copolymers of propylene and to processes for their production.

Propylene homopolymers and copolymers of propylene and other 1-alkenes are widely applied in the production of films, fibers and moldings from thermoplastic molding compositions. For brevity, both the propylene homopolymers and the propylene copolymers are frequently referred to in such cases as polypropylene. The polymers used for producing films, in particular biaxially stretched films, are in particular homopolymers or random copolymers of propylene. The biaxially stretched films produced from these materials are often also termed BOPP (biaxially oriented polypropylene) films.

However, when producing biaxially polypropylene oriented films it is not only desirable that the resultant films have good mechanical and service properties, such as stiffness, toughness, transparency or gloss; good processability is also a prime requirement. Good processability results firstly in a trouble-free production process. This is desirable since every interruption of continuous production (e.g. a film break-off) requires a time-consuming restart of production. Secondly, better film quality is obtained, for example more uniform thickness distribution. Good processability also means that the production process is not excessively sensitive to temperature variations, i.e. that a large amount of processing latitude is available.

Since the processability of conventional propylene homopolymers is not adequate to allow their use in the production of biaxially stretched films, use is frequently made of propylene homopolymers having increased soluble fractions. However, films produced from these materials have disadvantages in stiffness, and their processability is still not satisfactory.

Conventional random propylene copolymers, as described, for example, in EP-A 778 295, are unsuitable for producing BOPP films, since their stiffness would be far too low. In addition, their high soluble fractions makes it impossible to use the films in the food packaging sector.

EP-A 339 804 describes reactor blends made from a propylene homopolymer and a random propylene copolymer and particularly suitable for producing oriented films. However, such reactor blends can be obtained only via a reactor cascade and are therefore unattractive on cost grounds.

To improve extensibility, U.S. Pat. No. 4,355,144 proposes the use of a random propylene-ethylene copolymer with from 0.1 to 1.0% by weight of ethylene, polymerized with a titanium trichloride-containing catalyst. However, even with very small amounts of ethylene the isotacticity of the copolymer is drastically reduced, and the stretched products obtained have low stiffness and high extractable fractions.

EP-A 115 940 discloses propylene-ethylene copolymers suitable for producing biaxially stretched films and having from 0.1 to 2.0 mol % of ethylene and high isotacticity. The isotacticity is determined as triad tacticity in the $^{13}C$ NMR spectrum. Although these copolymers have good extensibility, stiffness, transparency, impact strength and resistance to heat shrinkage, their mechanical, optical and rheological properties are frequently inadequate for the requirements of BOPP film manufacturers. In particular, it is frequently the case that they do not have ideal processability at the same time as very good mechanical properties.

SUMMARY OF THE INVENTION

It is an object of the present invention to develop polypropylenes which have further improved processability and from which it is possible to produce biaxially stretched films having high stiffness, toughness and transparency.

We have found that this object is achieved by means of the random copolymers, defined at the outset, of propylene with other 1-alkenes having up to 10 carbon atoms. We have also found a process for preparing the random copolymers of propylene, their use for producing films, fibers or moldings, the films, fibers and moldings themselves, and also biaxially stretched films made from such random copolymers of propylene, and processes for their production.

Other 1-alkenes having up to 10 carbon atoms here are linear or branched 1-alkenes which have from two to ten carbon atoms, with the exception of propylene. Preference is given to linear 1-alkenes. Those which may be mentioned in particular are ethylene, 1-butene, 1-pentene, 1-hexene, 1-heptene and 1-octene and mixtures of these comonomers, preference being given to ethylene or 1-butene. The particularly preferred copolymers may be propylene-ethylene or propylene-1-butene copolymers or propylene-ethylene-1-butene terpolymers.

Such random propylene copolymers generally have an ethylene content of from 0.7 to 1.4% by weight, preferably from 0.75 to 1.2% by weight, if the propylene copolymers are propylene-ethylene copolymers without other comonomers. If the propylene copolymers comprise $C_4$–$C_{10}$-1-alkenes as comonomers, i.e. if they are copolymers of propylene and at least one $C_4$–$C_{10}$-1-alkene or copolymers of propylene, ethylene and at least one $C_4$–$C_{10}$-1-alkene, the content of comonomer is usually in the range from 0.7 to 3.0% by weight and preferably from 0.75 to 1.9% by weight. The contents of $C_4$–$C_{10}$-1-alkenes expressed in % by weight in such random propylene copolymers are mostly somewhat higher than those of ethylene, since the molecular ratio of the monomers determines the influence of comonomer incorporation on the properties of the polymer.

Such random propylene copolymers also usually have a cold-xylene-soluble fraction of from 1.0 to 2.5% by weight, in particular from 1.5 to 2.0% by weight, if ethylene is present in the propylene copolymers, i.e. if they are propylene-ethylene copolymers or copolymers of propylene, ethylene and at least one $C_4$–$C_{10}$-1-alkene. If the propylene copolymers are copolymers of propylene and at least one $C_4$–$C_{10}$-1-alkene, but without ethylene, the cold-xylene-soluble fraction is generally in the range from 0.75 to 2.0% by weight and preferably from 0.8 to 1.4% by weight.

The xylene-soluble fractions of such random copolymers are normally somewhat higher when ethylene is used as comonomer, since ethylene is incorporated predominantly in the low-molecular-weight region.

The cold-xylene-soluble fractions are the fractions determined according to a method based on ISO Standard 1873-1:1991. The method consists in placing 5 g of polypropylene into 500 ml of distilled xylene previously heated to 100° C. The mixture is then heated to the boiling point of the xylene and held at this temperature for 60 min. A cooling bath is then used to achieve cooling to 5° C. within a period of 20 min, and this is followed by reheating to 20° C. This temperature is held for 30 min. The precipitated polymer is filtered off. Exactly 100 ml of the filtrate are taken and the solvent removed on a rotary evaporator. The residue is dried for about 2 h at 80° C./250 mbar to constant weight, and weighed after cooling.

The xylene-soluble fraction is given by $$X_L = \frac{g \times 500 \times 100}{G \times V}$$

where
$X_L$=xylene-soluble fraction in %,
g=measured weight in g,
G=starting weight in g,
V=volume in ml of filtrate used.

Surprisingly, it is precisely when the xylene-soluble fraction is within the range given above that the processability to give biaxially stretched films is particularly good.

DETAILED DESCRIPTION OF THE INVENTION

It has now been found that the random copolymers of propylene with other 1-alkenes having up to 10 carbon atoms are particularly suitable for the production of biaxially stretched films, i.e. have particularly good processability, if the viscosity of their melt changes little in the vicinity of the melting point. In this connection, the melting point is the lowest temperature at which the polymer is completely molten, and the melt is the polymer in completely or partially molten condition. It is particularly advantageous for the flow properties of the melt to have low temperature dependency, since the temperature of the polymer melt changes several times in the course of film production and very high temperature gradients can arise here.

One way of recording the viscosity change with temperature is to determine the values $Q_5$ and $Q_3$, where $Q_5$ is given by $$Q_5 = 1000 \times \frac{\mu(T_m)}{\mu(T_m - 5K)}$$

and $Q_3$ is given by $$Q_3 = 1000 \times \frac{\mu(T_m)}{\mu(T_m - 3K)}$$

and $\mu(T_m)$ is the elongational viscosity of the random copolymer of propylene at the lowest temperature at which the copolymer is fully molten, $\mu(T_m-5K)$ is the elongational viscosity at a temperature which is lower by 5K and $\mu(T_m-3K)$ is the elongational viscosity at a temperature which is lower by 3K, and at all of the temperatures T the elongational viscosities $\mu(T)$ are determined 2 seconds after stretching begins at a constant strain rate (Hencky strain rate) $\dot{\epsilon}$ of 0.2 s$^{-1}$.

The elongational viscosities are generally measured using an elongation rheometer. Such devices are available commercially, for example from Rheometric Scientific. They use two pairs of clamps to stretch a rectangular specimen at a constant Hencky strain rate ($\dot{\epsilon}$=l$^{-1}$ dl/dt), the specimen being supported by a stream of hot nitrogen. To prevent the occurrence of orientations in the specimen, the polymer to be studied is firstly extruded through a die, then compressed to give a flat strip of 2 mm thickness and slowly cooled to room temperature. The strip is cut to give a rectangular specimen of dimensions 2×8×56 mm$^3$, and the specimen is then placed into the preheated elongation rheometer, held after insertion for ten minutes at this temperature, and then stretched. Since a constant Hencky strain rate $\dot{\epsilon}$ is used, the elongation $\epsilon$ is directly proportional to time. A Hencky strain rate $\dot{\epsilon}$ of 0.2 s$^{-1}$ has proven very suitable.

If the measurement is carried out at a temperature at which the specimen is fully molten, the viscosity increases in the course of measurement (i.e. as elongation increases) and then levels out at a plateau. An example of behavior of this type can be seen in the 166° C. curve of FIG. 1 below. The curve of elongational viscosity corresponds to three times the shear viscosity (Trouton viscosity). At temperatures at which the specimen is only partially molten, strain hardening induced by crystallization can be observed (151° C. curve in FIG. 1). The gradient of the curve increases as elongation $\epsilon$ increases, and the elongational viscosity begins to rise faster than the Trouton viscosity.

Since the viscosities also depend on the elongation of the specimen (i.e. on the stretching test time), the elongational viscosities $\mu(T)$ have to be compared for different temperatures at the same elongation $\epsilon$ (i.e. at the same elongation test time t). A time which has proven suitable for the Hencky strain rate $\dot{\epsilon}$=0.2 s$^{-1}$ is t=2 s (i.e. $\epsilon$=0.4). The elongational viscosities $\mu(T)$ are therefore preferably determined 2 seconds after stretching begins at a constant Hencky strain rate $\dot{\epsilon}$ of 0.2 s$^{-1}$.

Figure 2:
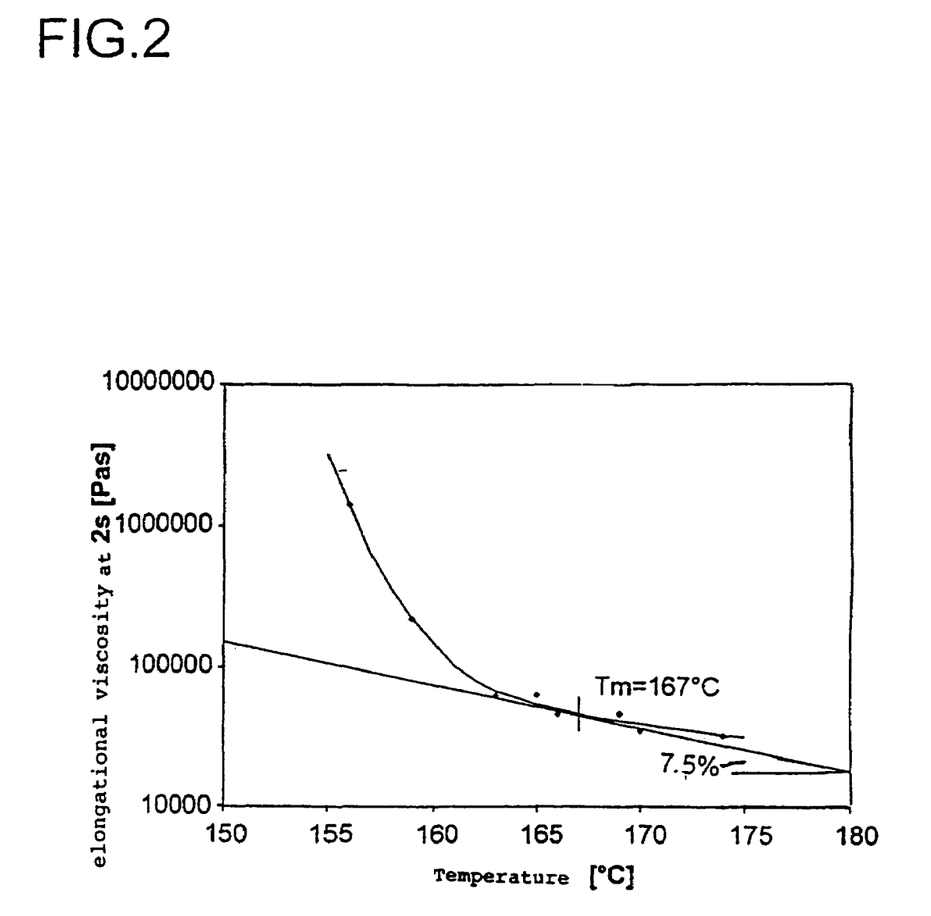
FIG. 2 is a graph of elongational viscosity against temperature.

The melting point $T_m$ at which the copolymer has just become completely molten can be discerned from a graph of the logarithmically plotted elongational viscosity $\mu(T)$ 2 seconds after stretching begins at a constant Hencky strain rate $\dot{\epsilon}$ of 0.2 s$^{-1}$ against the temperature T. The melting point $T_m$ here is the temperature at which the elongational viscosity is less than 7.5% higher than at T+1K and is lower by at least 7.5% than at T−1K. An example of this is shown in FIG. 2 below. The melting point $T_m$ shown here is the temperature at which a straight line of negative gradient 7.5% just touches the curve of the elongational viscosities $\mu(T)$ plotted against the temperature T.

The novel propylene copolymers have low temperature-dependency in their flow properties and can thus be processed particularly well into biaxially stretched films. This can be seen from the fact that in a graph where, similarly to FIG. 2 below, $\mu(T)$ is plotted against temperature T there is only a slow rise in $\mu(T)$ for a temperature of less than $T_m$. This gives high values of Q. (If $\mu(T)$ were not to rise as the temperature falls, Q would be equal to 1000.) The novel propylene copolymers preferably have $Q_5$ greater than or equal to 200, and in particular greater than or equal to 300. $Q_3$ is preferably greater than or equal to 350, and in particular greater than or equal to 500.

The partly crystalline polymers are also particularly well suited for producing biaxially stretched films in cases where when the polymers are partly melted they show a large amount of strain hardening. The factor SH can be determined as a measure of strain hardening. For this, graphs similar to FIG. 1 below are used to determine firstly the maximum gradient of the elongational viscosity at temperatures lower then $T_m$–5K and secondly the gradient 1 second after stretching begins at a constant Hencky strain rate $\dot{\epsilon}$ of 0.2 s$^{-1}$ and a temperature of $T_m$–5K. The factor SH is then the ratio of these two gradients as given by the formula $$SH = \frac{\max(m(\mu(T \leq T_m - 5K)))}{m(\mu(T = T_m - 5K, t = 1s))},$$

where m is the gradient. The novel propylene copolymers preferably have SH factors greater than 1.5.

It is particularly advantageous if both effects are very pronounced and the parameter PI (Processability Index), given by the formula $$PI = \ln(SH+1) \cdot (\ln Q_3 + \ln Q_5)$$

is very large. PI is a measure of the processing latitude and at the same time a numerical measure of the uniformity of the film profile to be expected. A high PI means a high degree of processing latitude and uniform film thickness.

The novel propylene copolymers preferably have PI values greater than 18 and in particular greater than 20.

The novel random copolymers of propylene with other 1-alkenes having up to 10 carbon atoms may be prepared in the usual reactors used for polymerizing 1-alkenes, either batchwise or preferably continuously, inter alia in solution, as suspension polymerization or as gas-phase polymerization. Examples of suitable reactors are continuously operated stirred tank reactors, loop reactors and fluidized-bed reactors. It is, of course, also possible to carry out the reaction in a series of a number of reactors placed one after the other. The polymerization is preferably carried out in the gas phase. Suitable gas-phase reactors for this purpose are fluidized-bed reactors and also horizontally or vertically agitated powder-bed reactors. The powder-bed reactors used are particularly those in which the reaction bed is kept moving by vertical agitators. The reaction bed is generally composed of the polymer produced in the respective reactor.

The polymerization of the novel random propylene copolymers is preferably carried out from the gas phase at from 50 to 100° C., preferably from 60 to 90° C., and at pressures of from 15 to 40 bar, preferably from 20 to 35 bar, in the presence of a Ziegler-Natta catalyst system comprising a) a titanium-containing solid component comprising at least one halogen-containing magnesium compound and an electron donor, b) an aluminum compound and c) another electron-donor compound.

The average residence time is generally from 0.5 to 5 hours, preferably from 0.5 to 3 hours. The ratio of partial pressures of propylene and of the comonomers is preferably adjusted to from 400:1 to 15:1. If the random copolymers are propylene-ethylene copolymers, the ratio of partial pressures of propylene and ethylene are particularly preferably from 200:1 to 30:1 and in particular from 150:1 to 50:1. If the random propylene copolymers comprise, as comonomers, at least one $C_4$–$C_{10}$-1-alkene, the ratio of partial pressures of propylene and of the comonomers is particularly preferably from 350:1 to 30:1 and in particular from 250:1 to 40:1.

The titanium compounds generally used to prepare the titanium-containing solid component a) are the halides or alcoholates of tri- or tetravalent titanium. Alkoxytitanium halide compounds or mixtures of different titanium compounds may also be used. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-iso-}C_3H_7)Cl_3$, $Ti(O\text{-n-}C_4H_9)Cl_3$, $Ti(OC_2H_5)Br_3$, $Ti(O\text{-n-}C_4H_9)Br_3$, $Ti(OCH_3)_2Cl_2$, $Ti(OC_2H_5)_2Cl_2$, $Ti(O\text{-n-}C_4H_9)_2Cl_2$, $Ti(OC_2H_5)_2Br_2$, $Ti(OCH_3)_3Cl$, $Ti(OC_2H_5)_3Cl$, $Ti(O\text{-n-}C_4H_9)_3Cl$ $Ti(OC_2H_5)_3Br$, $Ti(OCH_3)_4$, $Ti(OC_2H_5)_4$ or $Ti(O\text{-n-}C_4H_9)_4$. Preference is given to the use of those titanium compounds in which the halogen present is chlorine. Preference is also given to those titanium halides which contain only titanium and halogen, and among these particularly titanium chlorides and in particular titanium tetrachloride.

The titanium-containing solid component a) comprises at least one halogen-containing magnesium compound or a mixture of different halogen-containing magnesium compounds. Halogens here are chlorine, bromine, iodine and fluorine or mixtures of two or more halogens. Chlorine and bromine are preferred, in particular chlorine.

The halogen-containing magnesium compounds are either used directly during the preparation of the titanium-containing solid component a) or are formed during its preparation. Suitable magnesium compounds for preparing the titanium-containing solid component a) are in particular the magnesium halides, such as in particular the chlorides or bromides, or magnesium compounds from which the halides can be obtained in a usual manner, e.g. by reaction with halogenating agents, for example alkylmagnesium compounds, arylmagnesium compounds, alkoxymagnesium compounds or aryloxymagnesium compounds or Grignard compounds. Examples of suitable halogenating agents are halogens, hydrogen halides, $SiCl_4$ and $CCl_4$, and preferably chlorine or hydrogen chloride.

Examples of halogen-free compounds of magnesium which are suitable for preparing the titanium-containing solid component a) are diethylmagnesium, di-n-propylmagnesium, di-isopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, di-iso-propyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxy- magnesium, n-butyloxyoctyloxymagnesium and diphenoxymagnesium. Among these, particular preference is given to n-butylethylmagnesium and n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

Other than magnesium dichloride or magnesium dibromide, preference is given in particular to the di-($C_1$–$C_{10}$-alkyl)-magnesium compounds for preparing the titanium-containing solid component a).

The titanium-containing solid component a) also comprises electron-donor compounds, for example mono- or polyfunctional carboxylic acids, carboxylic anhydrides or carboxylic esters, or also ketones, ethers, alcohols, lactones or organophosphorus or organosilicon compounds.

The electron-donor compounds used in the titanium-containing solid component are preferably carboxylic acid derivatives, and in particular phthalic acid derivatives of the formula (II)

(II)

where each of X and Y is chlorine or bromine or $C_1$–$C_{10}$-alkoxy or X and Y jointly are oxygen in an anhydride function. Particularly preferred electron-donor compounds are phthalic esters, where X and Y are $C_1$–$C_8$-alkoxy, for example methoxy, ethoxy, n-propyloxy, isopropyloxy, n-butyloxy, sec-butyloxy, iso-butyloxy or tert-butyloxy. Examples of phthalic esters whose use is preferred are diethyl phthalate, di-n-butyl phthalate, di-iso-butyl phthalate, di-n-pentyl phthalate, di-n-hexyl phthalate, di-n-heptyl phthalate, di-n-octyl phthalate and di-2-ethylhexyl phthalate.

Other preferred electron-donor compounds in the titanium-containing solid component are diesters of 3- or 4-membered, unsubstituted or substituted cycloalkyl-1,2-dicarboxylic acids, and also monoesters of benzophenone-2-carboxylic acids or of substituted benzophenone-2-carboxylic acids. The hydroxy compounds used for these esters are the alkanols usually used in esterification reactions, for example $C_1$–$C_{15}$ alkanols or $C_5$–$C_7$ cycloalkanols, and these themselves may carry one or more $C_1$–$C_{10}$-alkyl groups, and also $C_6$–$C_{10}$ phenols.

It is also possible to use mixtures of different electron-donor compounds.

In preparing the titanium-containing solid component a), use is generally made of from 0.05 to 2.0 mol of the electron-donor compounds, preferably from 0.2 to 1.0 mol of the electron-donor compounds, per mole of the magnesium compound.

In a particularly preferred embodiment, the titanium-containing solid component a) also comprises at least one inorganic oxide as support. The support generally used is a finely divided inorganic oxide which has an average particle diameter of from 5 to 200 μm, preferably from 20 to 70 μm. The average particle diameter here is the volume-based average (median) of the particle size distribution determined by Coulter counter analysis according to ASTM Standard D 4438.

The grains of the finely divided inorganic oxide are preferably composed of primary particles which have an average particle diameter of from 1 to 20 μm, in particular from 3 to 10 μm. The primary particles are porous, granular oxide particles which are generally obtained from a hydrogel of the inorganic oxide by grinding. It is also possible to screen the primary particles before their further processing.

The inorganic oxide whose use is preferred is also one which has cavities and/or channels with an average diameter of from 0.1 to 20 μm, in particular from 1 to 15 μm, the macroscopic volume proportion of which is in the range from 5 to 30% of the entire particles, in particular in the range from 10 to 30% of the entire particles.

The average particle diameter of the primary particles, and the average diameter of the cavities and/or canals, and also the macroscopic volume proportion of the cavities and canals of the inorganic oxide are usefully determined by image analysis with the aid of scanning electron microscopy and/or electron probe microanalysis, in each case on grain surfaces and on grain cross sections of the inorganic oxides. The resultant electron microscope images are evaluated, and the average particle diameters of the primary particles and the macroscopic volume proportion of the cavities and canals determined therefrom. The image analysis is preferably carried out by transferring the electron microscopy data into a binary image of gray values and digital evaluation by means of a suitable EDP program.

The inorganic oxide whose use is preferred may be obtained, for example, by spray drying the ground hydrogel which for this purpose is mixed with water or with an aliphatic alcohol. Finely divided inorganic oxides of this type are also available commercially.

The finely divided inorganic oxide also usually has a pore volume of from 0.1 to 10 $cm^3/g$, preferably from 1.0 to 4.0 $cm^3/g$, and a specific surface area of from 10 to 1000 $m^2/g$, preferably from 100 to 500 $m^2/g$. The values here are determined by mercury porosimetry in accordance with DIN 66133 and by nitrogen adsorption in accordance with DIN 66131.

Possible inorganic oxides are in particular those of silicon, of aluminum, of titanium or of one of the metals of the 1st or 2nd main groups of the Periodic Table. Examples of preferred oxides are alumina, magnesia and phyllosilicates. Particular preference is given to the use of silica. It is also possible to use mixed oxides, such as aluminum silicates or magnesium silicates.

The surfaces of the inorganic oxides used as supports comprise water. Some of this water is physically bound by adsorption and some is chemically bound in the form of hydroxyl groups. Thermal chemical treatment can reduce, or completely remove, the water content of the inorganic oxide. The chemical treatment generally uses customary drying agents, such as $SiCl_4$, chlorosilanes or alkylaluminum compounds. The water content of suitable inorganic oxides is from 0 to 6% by weight. The water content is usually determined by drying the inorganic oxide to constant weight at 160° C. under atmospheric pressure. The reduction in weight corresponds to the original content of water. Inorganic oxides are preferably used in the form available commercially, without further treatment.

If an inorganic oxide is used, the amounts of inorganic oxide and magnesium compound in the titanium-containing solid component a) are preferably such that from 0.1 to 1.0 mol of magnesium compound, in particular from 0.2 to 0.5 mol of magnesium compound is present per mole of the inorganic oxide.

In preparing the titanium-containing solid component a) use is generally also made of $C_1$–$C_8$ alkanols, such as methanol, ethanol, n-propanol, isopropanol, n-butanol, sec-butanol, tert-butanol, isobutanol, n-hexanol, n-heptanol, n-octanol or 2-ethylhexanol or mixtures of these. Preference is given to the use of ethanol.

The titanium-containing solid component may be prepared by methods known per se, inter alia those described in EP-A 45 975, EP-A 45 977, EP-A 86 473, EP-A 171 200, GB-A 2 111 066, U.S. Pat. No. 4,857,613 and U.S. Pat. No. 5,288,824.

The following two-stage process is preferably used for preparing the titanium-containing solid component a):

In the first step, carried out in an inert solvent, preferably in a liquid alkane or in an aromatic hydrocarbon, e.g. toluene or ethylbenzene, the inorganic oxide is mixed with a solution of the magnesium-containing compound, and this mixture is then allowed to react, generally with stirring, for from 0.5 to 5 hours at from 10 to 120° C. A halogenating agent is then added in at least two-fold excess, preferably five-fold excess, based on the magnesium-containing compound, and the mixture allowed to react for from about 30 to 120 minutes. The $C_1$–$C_8$ alkanol, the titanium compound and the electron-donor compound are then added at from −20 to 150° C. The titanium compound and the electron-donor compound may be added simultaneously with the $C_1$–$C_8$ alkanol, but it is also possible for the $C_1$–$C_8$ alkanol firstly to be allowed to act on the intermediate product for from about 10 to 120 minutes at from 0 to 100° C. From 1 to 5 mol of the $C_1$–$C_8$ alkanol, preferably from 1.6 to 4 mol of the $C_1$–$C_8$ alkanol, and from 1 to 15 mol of the titanium compound, preferably from 2 to 10 mol of the titanium compound, and from 0.01 to 1 mol of the electron-donor compound, preferably from 0.3 to 0.7 mol of the electron-donor compound, are used per mole of magnesium. This mixture is allowed to react for at least 10 minutes, in particular at least 30 minutes, at from 10 to 150° C., preferably from 60 to 130° C., generally with stirring. The resultant solid material is then filtered off and washed with a $C_7$–$C_{10}$ alkylbenzene, preferably with ethylbenzene.

In the second step, the solid obtained from the first step is extracted at from 100 to 150° C. with an excess of titanium tetrachloride or with an excess of titanium tetrachloride solution in an inert solvent, preferably in a $C_7$–$C_{10}$ alkylbenzene, where the solvent comprises at least 5% by weight of titanium tetrachloride. The extraction is generally carried out for a period of at least 30 minutes. The product is then washed with a liquid alkane until the titanium tetrachloride content of the wash liquid is less than 2% by weight.

Suitable aluminum compounds b) other than trialkylaluminum compounds are those compounds in which an alkyl group has been replaced by an alkoxy group or by halogen, for example by chlorine or bromine. The alkyl groups may be identical or differ from one another. Linear or branched alkyl groups are possible. Preference is given to trialkylaluminum compounds each of whose alkyl groups has from 1 to 8 carbon atoms for example trimethylaluminum, triethylaluminum, triisobutylaluminum, trioctylaluminum or methyldiethylaluminum or mixtures of these.

Besides the aluminum compound b), electron-donor compounds c), such as mono- or polyfunctional carboxylic acids, carboxylic anhydrides or carboxylic esters, or also ketones, ethers, alcohols or lactones, and also organophosphorus or organosilicon compounds, are used as a further cocatalyst. The electron-donor compounds c) may be identical with or differ from the electron-donor compounds used to prepare the titanium-containing solid component a). Preferred electron-donor compounds here are organosilicon compounds of the formula (I)

$$R^1{}_n Si(OR^2)_{4-n} \tag{I}$$

where $R^1$ are identical or different and are $C_1$–$C_{20}$ alkyl, 5- to 7-membered cycloalkyl, which itself may be substituted by $C_1$–$C_{10}$-alkyl, or are $C_6$–$C_{18}$-aryl or $C_6$–$C_{18}$-aryl-$C_1$–$C_{10}$-alkyl, $R^2$ are identical or different and are $C_1$–$C_{20}$-alkyl, and n is the integer 1, 2 or 3. Particular preference is given to those compounds in which $R^1$ is $C_1$–$C_8$-alkyl or 5- to 7-membered cycloalkyl and $R^2$ is $C_1$–$C_4$-alkyl and n is 1 or 2.

Among these compounds, particular emphasis may be given to diisopropyldimethoxysilane, isobutylisopropyldimethoxysilane, diisobutyldimethoxysilane, dicyclopentyldimethoxysilane, dicyclohexyldimethoxysilane, cyclohexylmethyldimethoxysilane, isopropyl-tert-butyldimethoxysilane, isobutyl-sec-butyl-dimethoxysilane and isopropyl-sec-butyldimethoxysilane. Very particular preference is given to dicyclopentyldimethoxysilane.

The compounds b) and c) acting as cocatalysts may be allowed to act on the titanium-containing solid component a) either individually, one after the other in any desired sequence, or together simultaneously. This is usually done at from 0 to 150° C., in particular at from 20 to 90° C., and at pressures of from 1 to 100 bar, in particular from 1 to 40 bar.

The cocatalyst b) is preferably used in an amount such that the atomic ratio of aluminum from the aluminum compound b) to titanium from the titanium-containing solid component a) is from 10:1 to 800:1, in particular from 20:1 to 200:1.

In the preferred method, the molar ratio between the aluminum compound b) and the other electron-donor compound c) is in the range from 20:1 to 2:1, in particular from 15:1 to 5:1.

The molar mass of the random copolymers of propylene may be adjusted over a wide range and controlled by adding regulators widely used in polymerization technology, for example hydrogen. Concomitant use may also be made of inert solvents, such as toluene or hexane, inert gases, such as nitrogen or argon, and relatively small amounts of polypropylene powder. The novel random propylene copolymers preferably have molar masses (weight average) of from 80 000 to 600 000 g/mol. Their melt flow rates (MFRs) at 230° C. and under a 2.16 kg load, in accordance with ISO 1133, are in the range from 0.1 to 100 g/10 min, in particular from 0.5 to 50 g/10 min.

The novel random propylene copolymers usually comprise additives, such as stabilizers, lubricants, mold-release agents, fillers, nucleating agents, antistats, plasticizers, dyes, pigments or flame retardants, which are added in the usual amounts before use. These are generally incorporated into the polymer during the granulation of the polymerization product, produced in the form of a powder.

Usual stabilizers are antioxidants, such as sterically hindered phenols, processing stabilizers, such as phosphites or phosphonites, acid scavengers, such as calcium stearate or zinc stearate or dihydrotalcite, sterically hindered amines, or else UV stabilizers. The novel polymers generally comprise one or more of the stabilizers in amounts of up to 2% by weight.

Examples of suitable lubricants and mold-release agents are fatty acids, the calcium or zinc salts of the fatty acids, or fatty acid amides, or low-molecular-weight polyolefin waxes, usually used in concentrations of up to 2% by weight.

Examples of possible fillers for the random propylene copolymers are talc, chalk or glass fibers, and the amounts which may be used here are up to 50% by weight.

Examples of suitable nucleating agents are inorganic additives, such as talc, silica or kaolin, salts of mono- or polycarboxylic acids, such as sodium benzoate or aluminum tert-butylbenzoate, dibenzylidenesorbitol or its $C_1$–$C_8$-alkyl-substituted derivatives, such as methyl- or dimethyldibenzylidenesorbitol, or salts of diesters of phosphoric acid, such as sodium 2,2'-methylenebis(4,6-di-tert-butylphenyl) phosphate. The nucleating agent content of the random propylene copolymers is generally up to 5% by weight.

Additives of this type are generally commercially available and are described, for example, in Gächter/Müller, Plastics Additives Handbook, 4th edition, Hansa Publishers, Munich, 1993.

Compared with the random propylene copolymers known hitherto, particular features of the novel random copolymers of propylene with other 1-alkenes having up to 10 carbon atoms are good stiffness, toughness and transparency, and also better processability to give biaxially stretched polypropylene films. Due to these good technical properties, the novel random propylene copolymers are particularly suitable for producing films, fibers and moldings.

The invention also relates to biaxially stretched films produced from the novel random copolymers of propylene with other 1-alkenes having up to 10 carbon atoms and having a stretching ratio of at least 4:1 in the longitudinal direction and of at least 5:1 in the transverse direction.

The biaxially stretched films may be produced by melt extrusion of the propylene copolymer through a die, the resultant film then being cooled to from 100 to 20° C. so that it solidifies, and the solidified film being stretched in the longitudinal direction at from 80 to 150° C. with a stretching ratio of at least 4:1 and in the transverse direction at from 120 to 170° C. with a stretching ratio of at least 5:1.

To this end, the propylene copolymer is melted at, for example, from 220 to 300° C., preferably from 240 to 280° C., in an extruder. Other additives or polymers may be added in the extruder. The melt is extruded through a flat-film die or an annular die.

The film is then cooled so that it solidifies. In the case of extrusion through a flat-film die, the cooling is usually carried out using one or more take-off rolls whose surface temperature is, for example, from 10 to 100° C., preferably from 20 to 70° C. If an annular die is used, air or water at from 0 to 40° C. is usually used to cool the film bubble.

The resultant film is then stretched longitudinally and transversely to the direction of extrusion, giving an orientation of the molecule chains. The first stretching may be in the longitudinal or the transverse direction, or stretching may be carried out simultaneously. In the case of flat-film-die extrusion, the longitudinal stretching is generally carried out first with the aid of more than one pair of rollers running at different speeds corresponding to the stretching ratio desired. The transverse stretching is then carried out with the aid of an appropriate tenter frame. When an annular die is used the stretching is generally carried out simultaneously in both directions by blowing a gas into the film bubble.

Before the stretching procedure, it is possible to preheat the film to, for example, from 60 to 110° C. The longitudinal stretching preferably takes place at from 80 to 150° C., in particular from 110 to 140° C., and the transverse stretching at from 120 to 170° C., in particular from 155 to 165° C. The longitudinal stretching ratio is generally at least 4:1, preferably from 4.5:1 to 9.0:1 and in particular from 5.5:1 to 8.5:1. The transverse stretching ratio is generally at least 5:1, preferably from 5:1 to 12:1 and in particular from 5.5:1 to 10:1.

The biaxial stretching may be followed by a heat treatment for heat-setting, during which the film is held for from about 0.1 to 10 s at from 100 to 160° C. The film is then wound up in a usual manner by wind-up equipment.

During or after the production of the BOPP film, one or both surfaces may be corona- or flame-treated by one of the known methods, or a metal such as aluminum may be applied by vapor deposition.

It is also possible for the novel random propylene copolymers to form only one, or only some, of the layers of a biaxially stretched film built up from more than one layer.

The biaxially stretched films produced by the novel process from the novel random copolymers of propylene with other 1-alkenes having up to 10 carbon atoms have in particular excellent stiffness, excellent transparency and excellent barrier properties.

EXAMPLES

Random copolymers of propylene with ethylene or 1-butene were prepared and either studied for their suitability for producing biaxially stretched films or used to produce biaxially stretched films.

In each case, the polymerization of the random propylene copolymers took place in a continuously operated, vertically agitated gas-phase reactor with an available volume of 800 l at a temperature of 80° C. and a pressure of 28 bar. The reactor comprised an agitated fixed bed of finely divided polymer. In each case, a steady-state concentration of the monomers used was established in the gas space. To this end, the gas composition was determined at five-minute intervals by the use of a gas chromatograph, and regulated by supplementing with the amounts of monomer required. The reactor output was adjusted to 150 kg/h, i.e. to a space-time yield of 187.5 kg/m$^3$h, via the amount of titanium-containing solid component a) metered in. The corresponding average residence time of the polymer is 1.5 h.

The catalyst component b) added continuously during each polymerization was 210 mmol of triethylaluminum per gram of titanium-containing solid component a). The other electron-donor compound c), likewise fed in continuously, was 0.1 mol of dicyclopentyldimethoxysilane per mole of triethylaluminum.

The following tests were carried out to determine the properties of the specimens:

Determination of Average Particle Diameter:
    To determine the average particle diameter of the silica, the particle size distribution of the silica particles was determined by Coulter counter analysis in accordance with ASTM Standard D 4438, and this was used to calculate the volume-based average (median).

Determination of Pore Volume:
    Via mercury porosimetry in accordance with DIN 66133.

Determination of Specific Surface Area:
    Via nitrogen adsorption in accordance with DIN 66131.

Determination of Water Content:

To determine the water content, 5 g of silica were dried at 160° C. under atmospheric pressure for 15 min (constant weight). The weight reduction corresponded to the original water content.

Determination of Average Particle Size of Primary Particles, Average Diameter of Cavities and Channels and Macroscopic Volume Fraction of Cavities and Channels:

The average particle size of primary particles, average diameter of cavities and channels and macroscopic volume fraction of cavities and channels of the silicas used were determined with the aid of scanning electron microscopy and/or electron probe microanalysis, in each case on particle surfaces and on particle cross sections of the silica. The electron micrographs obtained were converted to a gray value binary image and analyzed digitally by means of the Analysis software package from SIS.

Determination of Productivity:

The productivity is the amount of polymer in grams which was obtained per gram of titanium-containing solid component a) used.

Determination of Ethylene Content and 1-Butene Content:

The ethylene content and 1-butene content were determined by $^{13}C$ NMR spectroscopy on polymer granules.

Determination of Chlorine Content:

The chlorine content of the polymers was determined by microcoulometric determination in accordance with DIN 51408 Part 2.

Determination of Xylene-soluble Fraction:

in accordance with ISO Standard 1873-1:1991.

To determine the xylene-soluble fraction, 5 g of propylene polymer were placed into 500 ml of distilled xylene (isomeric mixture) which had previously been heated to 100° C. The mixture was then heated to the boiling point of the xylene and held at this temperature for 60 min. Following this, a cooling bath was used for cooling to 5° C. within a period of 20 min, and this was followed by reheating to 20° C. This temperature was held for 30 min. The precipitated polymer was filtered off. Exactly 100 ml of the filtrate were taken and the solvent removed on a rotary evaporator. The residue was dried at 80° C./250 mbar for 2 h, and weighed after cooling.

The xylene-soluble fraction was then calculated from the formula $$X_L = \frac{g \times 500 \times 100}{G \times V}$$

where
$X_L$=xylene-soluble fraction in %,
g=measured weight in g,
G=weight of starting material in g and
V=volume in ml of the amount of filtrate used.

Determination of mm Triads:

By $^{13}C$ NMR spectroscopy on polymer granules.

Determination of Melt Flow Rate (MFR):

in accordance with ISO Standard 1133, at 230° C. and under a load of 2.16 kg.

Determination of $T_{m2}$:

The melting point $T_{m2}$ was determined by DSC measurement in accordance with ISO Standard 3146 using a first heating procedure with a heating rate of 20° C. per minute up to 200° C., a dynamic crystallization with a cooling rate of 20° C. per minute down to 25° C. and a second heating procedure with a heating rate of 20° C. per minute, again to 200° C.

Determination of G Modulus:

In accordance with ISO 6721-2, at 23° C.

Determination of $T_m$:

The elongational viscosity of the propylene polymer to be tested was determined at various temperatures using an elongation rheometer from Rheometric Scientific. To this end, the polymer was firstly extruded through a die, then compressed to give a flat strip of 2 mm thickness and slowly cooled to room temperature. A rectangular specimen of dimensions 2×8×56 mm3 was cut out from the strip. This was placed into the elongation rheometer, which had been heated to the test temperature, and the specimen was held for ten minutes at this temperature and then stretched at a constant Hencky strain rate $\dot{\epsilon}$ of 0.2 s$^{-1}$. The lowest temperature $T_m$ at which the propylene polymer is completely molten was determined from the shape of the curve in a graph of elongational viscosity μ(T) 2 seconds after stretching has begun at a constant Hencky strain rate E of 0.2 s$^{-1}$, plotted logarithmically against the test temperature T. This theological melting point $T_m$ is the temperature at which the elongational viscosity is less than 7.5% greater than at T+1K and is at least 7.5% less than at T−1K.

Determination of $Q_5$:

Values were determined for μ($T_m$) and μ($T_m$−5K) and inserted into the formula $$Q_5 = 1000 \times \frac{\mu(T_m)}{\mu(T_m - 5K)}.$$

μ($T_m$) is the elongational viscosity of the melt two seconds after stretching has begun with a constant Hencky strain rate $\dot{\epsilon}$ of 0.2 s$^{-1}$ at $T_M$.

μ($T_m$−5K) is the elongational viscosity of the melt two seconds after stretching has begun with a constant Hencky strain rate $\dot{\epsilon}$ of 0.2 s$^{-1}$ at $T_m$−5K.

Determination of $Q_3$:

Values were determined for μ($T_m$) and μ($T_m$−3K) and inserted into the formula $$Q_3 = 1000 \times \frac{\mu(T_m)}{\mu(T_m - 3K)}.$$

μ($T_m$−3K) is the elongational viscosity of the melt two seconds after stretching has begun with a constant Hencky strain rate $\dot{\epsilon}$ of 0.2 s$^{-1}$ at $T_m$−3K.

Determination of SH:
Graphs of elongational viscosity plotted against time on double logarithmic scale were used to determine the maximum gradient of the elongational viscosity at temperatures of less than $T_m-5K$ and the gradient 1 second after stretching had begun at a constant Hencky strain rate $\dot{\epsilon}$ of $0.2\ s^{-1}$ and a temperature of $T_m-5K$. The factor SH was determined from these values by the formula $$SH = \frac{\max(m(\mu(T \leq T_m - 5K)))}{m(\mu(T = T_m - 5K, t = 1s))}.$$

PI was calculated from $Q_3$, $Q_5$ and SH by the formula $PI=\ln(SH+1)\cdot(\ln Q_3+\ln Q_5)$ Determination of Processing Latitude:
To establish the temperature range within which it is possible to obtain BOPP films various stretching temperatures were used during the production of the BOPP films. The limitations on this temperature range are that at higher temperatures the film breaks off, and at lower temperatures the grip of the tenters begins to fail.

Determination of 2σ:
The film thickness profile of the BOPP films obtained was determined transversely to the direction of extrusion with the aid of a device for film thickness measurement. The value of 2σ is twice the standard deviation from the mean and is a measure of the uniformity of thickness of the film.

Determination of Modulus of Elasticity (Tensile Modulus of Elasticity) and Elongation at Break:
Strips of 15 mm width were cut out from biaxially stretched films in longitudinal and transverse directions. These were used to determine the tensile modulus of elasticity and the elongation at break in accordance with ISO Standard 527-2 at 23° C.

Determination of Haze:
In accordance with ASTM D-1003.

Determination of Gloss:
In accordance with ISO/IEC 2813.

Determination of Shrinkage:
In accordance with ISO 2577 (120° C./5 min).

Example 1 i) Preparation of the Titanium-Containing Solid Component $a_1$)
In a first step, a finely divided spherical silica prepared by spray drying and having an average particle diameter of 45 μm, a pore volume of 1.5 cm³/g, a specific surface area of 260 m²/g and a water content of 2.7% by weight was mixed with a solution of n-butyloctylmagnesium in n-heptane. 0.3 mol of the magnesium compound was used per mole of $SiO_2$. The finely divided silica gel also featured an average particle size of the primary particle of 3–5 μm and cavities and channels with a diameter of 3–5 μm. The macroscopic volume fraction of cavities and channels was about 15% of the entire particle. The solution was stirred at 95° C. for 45 minutes and then cooled to 20° C., and a 10-fold molar amount of hydrogen chloride, based on the organomagnesium compound, was then introduced. After 60 minutes the reaction product was mixed with 3 mol of ethanol per mole of magnesium, with continuous stirring. This mixture was stirred for 0.5 hour at 80° C. and then mixed with 7.2 mol of titanium tetrachloride and 0.5 mol of di-n-butyl phthalate, based in each case on 1 mol of magnesium.

The mixture was then stirred for 1 hour at 100° C. and the resultant solid material was filtered off and washed several times with ethylbenzene.

The resultant solid product was extracted for 3 hours at 125° C. with a 10% strength by volume solution of titanium tetrachloride in ethylbenzene. The solid product was then separated by filtration from the extraction medium and washed with n-heptane until the titanium tetrachloride content of the extraction medium had reduced to 0.3% by weight.

The titanium-containing solid component $a_1$) contained
3.5% by weight of Ti
7.4% by weight of Mg
28.2% by weight of Cl.

ii) Polymerization
The polymerization took place with the titanium-containing solid $a_1$) described above and a gas mixture which comprised, besides propylene, 2.7% by volume of hydrogen and 0.9% by volume of ethylene. The polymerization conditions are given in Table 1 below and the product properties measured are given in Table 2.

Figure 1:
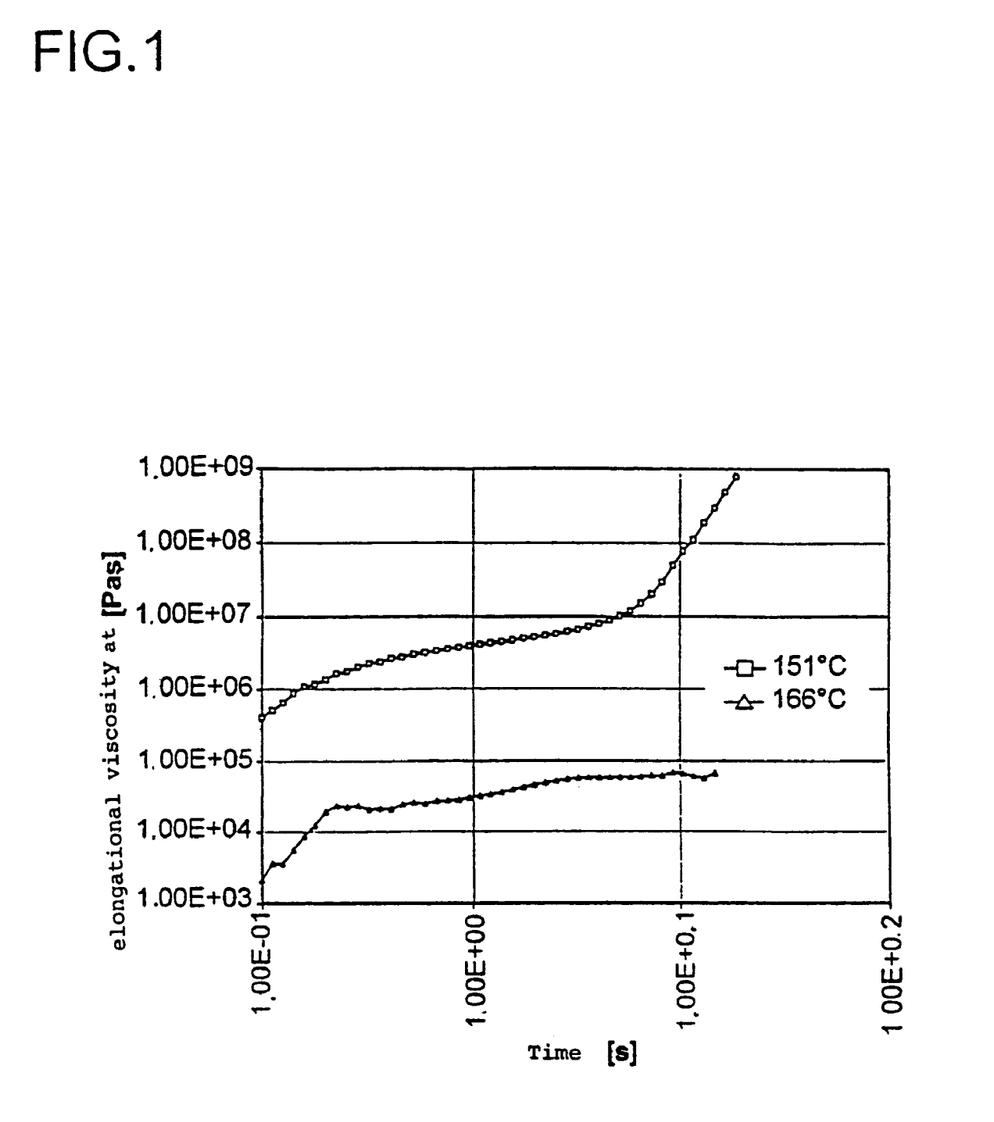
FIG. 1 is a graph of elongational viscosity against time.

FIG. 1 below shows the elongational viscosity μ curve for this polymer at a constant Hencky strain rate $\dot{\epsilon}$ of $0.2\ s^{-1}$ at the temperatures 151° C. and 166° C. At 166° C. the polymer is completely molten but at 151° C. crystallization-induced strain hardening can be seen. FIG. 2 below shows the elongational viscosity μ(T) curve for this polymer 2 seconds after stretching begins at a constant Hencky strain rate $\dot{\epsilon}$ of $0.2\ s^{-1}$ as a function of the temperature.

iii) Production of a Biaxially Stretched Film
A biaxially stretched film of thickness about 20 μm was produced from the random propylene-ethylene copolymer obtained, using a Brückner Maschinenbau pilot plant with a 1.3 m flat-film die and an output of 112 kg/h. The extruded film was cooled to 40° C., and the solidified film was stretched in the longitudinal direction at 125° C. and with a stretching ratio of 5.1:1 and in the transverse direction at 156° C. and with a stretching ratio of 8.8:1. The properties of the biaxially stretched film produced can be seen in Table 3 below.

Example 2

The titanium-containing solid $a_1$) described was used to prepare a random propylene-1-butene copolymer and, as described in Example 1, this was processed to give a biaxially stretched film of about 20 μm thickness. The polymerization conditions and the polymer properties and film properties measured are likewise listed in Tables 1 to 3.

Examples 3 and 4

In each case, the polymerization of the propylene copolymers took place with the titanium-containing solid $a_1$) described above. The polymerization properties and the polymer properties measured are given in Tables 1 and 2.

Comparative Example A

In a manner similar to that of Example 1, the titanium-containing 4 solid $a_1$) was used to prepare a random propylene-ethylene copolymer, and this was processed to give a biaxially stretched film of about 20 μm thickness. The polymerization conditions and the polymer properties and film properties measured are listed in Tables 1 to 3.

Comparative Examples B and C

In each case, the titanium-containing solid $a_1$) described above was used to polymerize the propylene copolymers. The polymerization conditions and polymer properties measured are given in Tables 1 and 2.

Comparative Example D

The titanium-containing solid $a_1$) described above was used for a homopolymerization of propylene under the conditions given in Table 1 below. The polymer properties are listed in Table 2.

Comparative Example E

As in Example 1, a biaxially stretched film of about 20 μm thickness was produced with a propylene homopolymer used commercially for OPP film production (Novolen® 1104 K from BASF Aktiengesellschaft). The properties of the polymer used for producing the film are likewise given in Table 2. The film properties can be seen in Table 3 below.

TABLE 3

|  | Example 1 | Example 2 | Comp. Ex. B | Comp. Ex. E |
|---|---|---|---|---|
| Processing latitude [° C.] | 12 | 12 | 3 | 9 |
| 2σ [μm] | 0.4 | 0.8 | 1.1 | 0.9 |
| Longitudinal modulus of elasticity [MPa] | 1518 | 1476 | 1458 | 1289 |
| Transverse modulus of elasticity [MPa] | 2767 | 2932 | 2976 | 3199 |
| Longitudinal elongation at break [%] | 194 | 182 | 178 | 173 |
| Transverse elongation at break [%] | 59 | 56 | 54 | 48 |
| Haze [%] | 0.1 | 0.1 | 0.1 | 0.1 |
| Gloss [scale divisions] | 129 | 126 | 127 | 119 |
| Longitudinal shrinkage [%] | 4.0 | 3.0 | 3.0 | 3.0 |
| Transverse shrinkage [%] | 5.3 | 3.0 | 3.5 | 3.0 |

It can be seen from Table 2 that in particular the polymers of Examples 1 to 4 according to the invention have PI values greater than 18 and $Q_5$ values greater than 200.

Comparison of Example 1 with Comparative Examples A and B clearly shows that lowering the ethylene content at practically identical xylene-soluble fractions gives random copolymers of propylene having higher stiffness (i.e. a higher G modulus) and higher melting point $T_{m2}$ but mark-

TABLE 1

|  | Example 1 | Example 2 | Example 3 | Example 4 | Comp. Ex. A | Comp. Ex. B | Comp. Ex. C | Comp. Ex. D |
|---|---|---|---|---|---|---|---|---|
| Pressure [bar] | 32 | 32 | 28 | 32 | 32 | 32 | 28 | 32 |
| Temperature [° C.] | 80 | 80 | 80 | 80 | 80 | 80 | 80 | 80 |
| Molar ratio of aluminum compound b)/electron donor c) | 10:1 | 10:1 | 10:1 | 10:1 | 10:1 | 10:1 | 10:1 | — |
| Hydrogen [% by vol.] | 0.81 | 0.76 | 0.72 | 0.76 | 0.59 | 0.56 | 0.74 | 1.0 |
| Ethylene [% by vol.] | 0.5 | — | — | 0.7 | 0.13 | 0.3 | — | — |
| 1-Butene [% by vol.] | — | 2.23 | 5.14 | — | — | — | 1.1 | — |
| Ratio of propylene partial pressure to that of the comonomers | 200:1 | 44:1 | 18:1 | 140:1 | 760:1 | 330:1 | 90:1 | — |
| Productivity [g polymer/g titanium-containing solid component a)] | 27200 | 22000 | 18300 | 21800 | 22600 | 21800 | 20500 | 12200 |

TABLE 2

|  | Example 1 | Example 2 | Example 3 | Example 4 | Comp. Ex. A | Comp. Ex. B | Comp. Ex. C | Comp. Ex. D | Comp. Ex. E |
|---|---|---|---|---|---|---|---|---|---|
| Ethylene in polymer [% by weight] | 1.1 | — | — | 1.1 | 0.1 | 0.5 | — | — | — |
| 1-Butene in polymer [% by weight] | — | 0.9 | 2.9 | — | — | — | 0.4 | — | — |
| Chlorine content [ppm] | 11.0 | 13.6 | 17.3 | 14.5 | 14.0 | 14.5 | 15.4 | 24.3 |  |
| $X_L$ [% by weight] | 1.7 | 0.9 | 1.7 | 2.3 | 1.7 | 1.9 | 1.65 | 1.5 | 3.2 |
| mm triads [%] | 98.7 |  |  |  |  | 98.7 |  |  |  |
| MFR [g/10 min] | 2.9 | 2.6 | 3.2 | 3.0 | 3.0 | 3.1 | 2.9 | 4.9 | 3.2 |
| $T_{m2}$ [° C.] | 155.7 | 161.3 | 155.3 | 156.3 | 164.7 | 160.7 | 162.9 |  | 165.5 |
| G Modulus [MPa] | 762 | 755 | 711 | 700 | 777 | 782 | 814 | 936 | 742 |
| $T_m$ [° C.] | 165 | 173 | 165 | 166 | 174 | 170 | 172 | 173 | 173 |
| $Q_5$ | 532 | 563 | 220 | 224 | 227 | 277 | 150 | 40 | 170 |
| $Q_3$ | 760 | 734 | 673 | 686 | 673 | 800 | 513 | 450 | 480 |
| SH | 4.0 | 4.2 | 4.3 | 4.7 | 1.7 | 2.0 | 2.5 | 2.8 | 3.9 |
| PI | 21 | 22 | 20 | 21 | 12 | 14 | 14 | 15 | 18 | edly lower values for PI and $Q_5$. The lowering of the ethylene content does not change the isotacticity of the copolymers, measured via the proportion of mm triads. Comparison of Example 2 and Comparative Example C also shows that lowering the comonomer content gives poorer values of PI and $Q_5$.

It can be seen from Comparative Examples D and E that although raising the xylene-soluble proportions gives higher values for PI and $Q_5$, the level of Examples 1 to 4 according to the invention is not achieved.

Table 3 confirms that propylene polymers with high values for PI and $Q_5$ have better processability to give biaxially stretched films. Examples 1 and 2 according to the invention have markedly greater processing latitude than Comparative Examples B and E, and the uniformity of film thickness is also greater (lower $2\sigma$ value).

We claim:

1. A random copolymer of propylene with other 1-alkenes having from 4 to 10 carbon atoms,
    whose content of comonomers is in the range from 0.7 to 3.0% by weight, and
    whose cold-xylene-soluble fraction is from 0.75 to 2.0% by weight.

2. A random propylene copolymer as claimed in claim 1, which comprises 1-butene as comonomer.

3. A random propylene copolymer as claimed in claim 1, whose $Q_5$ value is
    greater than or equal to 200, where $Q_5$ is given by $$Q_5 = 1000 \times \mu(Tm)/\mu(Tm-5K)$$

and $\mu(Tm)$ is the elongational viscosity of the random propylene copolymer at the lowest temperature at which the copolymer is fully molten, and $\mu(Tm-5K)$ is the elongational viscosity at a temperature which is lower by 5K, and the elongational viscosities are determined 2 seconds after stretching begins at a constant strain rate (Hencky strain rate) $\epsilon$ of $0.2$ s$^{-1}$.

4. A random propylene copolymer as claimed in claim 1, whose PI (Processability Index) is greater than 18, where the PI is determined from the formula $$PI = \ln(SH+1) \times (\ln Q_3 + \ln Q_5),$$

$Q_5$ is given by $$Q_5 = 1000 \times \mu(Tm)/\mu(Tm-5K)$$

and $Q_3$ is given by $$Q_3 = 1000 \times \mu(Tm)/\mu(Tm-3K),$$

$\mu(Tm)$ is the elongational viscosity at the lowest temperature at which the copolymer is fully molten, $\mu(Tm-5K)$ is the elongational viscosity at a temperature which is lower by 5K and $\mu(Tm-3K)$ is the elongational viscosity at a temperature which is lower by 3K, and the elongational viscosities are determined 2 seconds after stretching begins at a constant strain rate (Hencky strain rate) $\epsilon$ of $0.2$ s$^{-1}$,
    And the factor SH (Strain Hardening) is the ratio of the maximum gradient of the curve of elongational viscosity plotted against time on a double logarithmic scale for temperatures less than Tm−5K to the gradient of the elongational viscosity curve 1 second after stretching begins at a constant Hencky strain rate $\epsilon$ of $0.2$ s$^{-1}$ at a temperature of Tm−5K.

5. A film, a fiber or a molding comprising random propylene copolymers as claimed in claim 1.

6. A biaxially stretched film made from random propylene copolymers as claimed in claim 1 and having a stretching ratio of at least 4:1 in the longitudinal direction and of at least 5:1 in the transverse direction.

* * * * *

UNITED STATES PATENT AND TRADEMARK OFFICE
CERTIFICATE OF CORRECTION

PATENT NO. : 7,026,421 B2  
APPLICATION NO. : 10/971079  
DATED : April 11, 2006  
INVENTOR(S) : Appleyard et al.

It is certified that error appears in the above-identified patent and that said Letters Patent is hereby corrected as shown below:

In Claim 1, column 19, line 23 please delete:
"by weight." and substitute therefor:
-- by weight
said random copolymer being obtained in the presence of a Ziegler-Natta catalyst system comprising
a) a titanium-containing solid component comprising at least one halogen-containing magnesium compound and an electron donor,
b) an aluminum compound and
c) dicyclopentyldimethoxysilane. --

Signed and Sealed this

Fifteenth Day of August, 2006

JON W. DUDAS  
*Director of the United States Patent and Trademark Office*